US00RE42572E

(19) United States
(12) Reissued Patent
Murase

(10) Patent Number: US RE42,572 E
(45) Date of Reissued Patent: Jul. 26, 2011

(54) BELT DEVICE

(75) Inventor: Koji Murase, Osaka (JP)

(73) Assignee: Kyocera Mita Corporation, Osaka (JP)

(21) Appl. No.: 12/188,038

(22) Filed: Aug. 7, 2008

Related U.S. Patent Documents

Reissue of:
(64) Patent No.: 7,136,611
Issued: Nov. 14, 2006
Appl. No.: 11/258,889
Filed: Oct. 27, 2005

(51) Int. Cl.
*G03G 15/00* (2006.01)
(52) U.S. Cl. ..... 399/165; 399/162; 399/164
(58) Field of Classification Search ..... 399/162, 399/164–165
See application file for complete search history.

(56) References Cited

U.S. PATENT DOCUMENTS

| | | | | |
|---|---|---|---|---|
| 5,017,969 | A * | 5/1991 | Mitomi et al. | |
| 5,873,016 | A * | 2/1999 | Kurokawa et al. | 399/297 |
| 6,064,849 | A * | 5/2000 | Honda et al. | 399/302 |
| 6,160,978 | A * | 12/2000 | Tsuruoka et al. | |
| 6,478,142 | B2 * | 11/2002 | Cotter et al. | 198/781.09 |
| 6,733,407 | B2 * | 5/2004 | Wakana | 474/92 |
| 7,359,663 | B2 * | 4/2008 | Inui et al. | 399/302 |
| 7,623,816 | B2 * | 11/2009 | Maki et al. | 399/312 |
| 7,810,633 | B2 * | 10/2010 | Okamoto et al. | 198/806 |
| 7,819,240 | B2 * | 10/2010 | Kim | 198/809 |
| 2002/0085864 | A1 * | 7/2002 | Abe | 399/299 |
| 2004/0076455 | A1 * | 4/2004 | Fujiwara | 399/303 |
| 2005/0095041 | A1 * | 5/2005 | Kim et al. | 399/302 |
| 2007/0092308 | A1 * | 4/2007 | Miyamoto et al. | 399/301 |

FOREIGN PATENT DOCUMENTS

| | | | |
|---|---|---|---|
| JP | H07-214831 | A | 8/1995 |
| JP | 2002-193471 | A | 7/2002 |
| JP | 2003-246484 | A | 9/2003 |
| JP | 2006001670 | A * | 1/2006 |
| JP | 2009294575 | A * | 12/2009 |

* cited by examiner

*Primary Examiner* — David M. Gray
*Assistant Examiner* — Geoffrey T Evans
(74) *Attorney, Agent, or Firm* — Global IP Counselors, LLP

(57) ABSTRACT

Pulleys 29a, 29b are provided on both ends of the driven roller 28 as separate components from the driven roller 28, and on both edges in the width direction of the transfer belt 24, ribs 24a, 24b that can be engaged with the outer sides in the axial direction of the pulleys 29a, 29b are provided. If the transfer belt 24 becomes inclined to the left side during movement, the rib 24a on the right edge of the transfer belt 24 will be restricted by the outer side in the axial direction of the pulley 29a provided on the right side end of the driven roller 28, thereby correcting meandering to the left at the position of the driven roller 28.

5 Claims, 4 Drawing Sheets

BELT DEVICE

Matter enclosed in heavy brackets [ ] appears in the original patent but forms no part of this reissue specification; matter printed in italics indicates the additions made by reissue.

FIELD OF THE INVENTION

The present invention relates to a belt device, and more particularly to a meandering prevention device of an image forming device transfer belt.

BACKGROUND INFORMATION

For image forming devices, particularly color photocopiers, color printers and other color image forming devices, multistep drum types (tandem type) capable of higher speed processing than a single drum type device are becoming the mainstream. In a tandem color image forming device, image forming units, for example, magenta, yellow, cyan and black, are arranged by color in the paper transport direction, and a color toner image is sequentially formed by the image forming units of each color.

The image forming units of each color are arranged so as to face a transfer belt serving as an image support body, and the toner image sequentially formed by the image forming units of each color is transferred to the transfer belt by first transfer means. The transfer belt is endlessly wound on a plurality of rollers, and the toner image on the transfer belt is transferred to a transfer material by secondary transfer means. Meanwhile, the transfer material is transported from a sheet feed unit to a transfer position via a pair of resist rollers.

In such an image forming process, rippling or meandering may occur in the moving direction of a transfer belt wound endlessly on the plurality of rollers. Transfer belt meandering may cause image distortion, as in a square image becoming a parallelogram image and misalignment of color registration. Further, transfer belt rippling may cause image deformation, voids or the like.

In order to obtain a high-quality image where the colors are accurately superimposed and there is no image distortion, stable drive and transport without the occurrence of transfer belt meandering or rippling are necessary. Thus, a method has been proposed in which ribs are provided on the back of the belt on both sides thereof and the ribs are brought into direct contact with the retaining rolls, thereby preventing meandering. Although such a method in which ribs are provided on both sides of the belt is effective for preventing meandering, if for some reason, such as a difference in peripheral length of the two belt sides or the degree to which the rolls are parallel, a large meandering does occur, the ribs on both sides of the belt may ride up on the rolls.

In addition, technology has been proposed in which a steering roll inclines in response to belt meandering, thus correcting the meandering. Technology has also been proposed in which meandering correction rolls will be changed depending on the belt meandering direction. However, with such configurations, a meandering correction roll needs to be added, not only making the mechanical configurations complicated but also increasing the costs of the overall device.

Therefore, it is an object of the present invention to provide a belt device capable of preventing belt meandering with a simple configuration.

SUMMARY OF THE INVENTION

The belt device according to a first aspect of the present invention comprises a driving roller, driven roller, pulleys, and a belt, wherein ribs are formed on the edges of both sides of the belt. Here, the driving roller is driven by a drive unit, causing the belt to run. The driven roller is disposed opposite the driving roller, and the belt is stretched between the driving roller and the driven roller. The pulleys are provided on both ends of the driven roller and arranged so as to freely rotate coaxially and relatively with respect to the driven roller, and serve to prevent meandering. The ribs are provided at the edges of both sides of the belt, and serve to prevent meandering, and can engage with the outer sides of the pulleys in the axial direction.

With this device, the belt stretched between the driving roller and driven roller is driven and moved by the driving roller. When this occurs, the ribs provided on the edges of both sides of the belt will engage with the outer sides of the pulleys in the axial direction provided at both ends of the driven roller, thereby inhibiting belt meandering. There are conventional devices having ribs provided on both sides of the belt. However, if because of a difference in perimeter length of the two ends of the belt, there is a large difference in peripheral velocity in the belt width direction, there will be significant belt meandering and the ribs may ride up on the rollers. In this case, however, because pulleys are provided at both ends of the driven roller so as to freely rotate coaxially and relatively with respect to the driven roller, the engaging surfaces of the ribs on the belt come in direct contact and unitarily rotate with the pulleys. Belt meandering is therefore inhibited. Further, wear of the engaging surfaces of the ribs can be reduced.

Further, when the driven roller is free, there is a large gap between the driving roller and driven roller, and the belt is long, belt meandering will gradually develop in magnitude due to imprecision in belt processing or deviations in roller cylindricity because there is no meandering restriction means on the driven roller. However, with the present invention, because pulleys are provided on the driven roller, belt movement can be regulated from the driven roller, and meandering prevention effects are notably greater than cases where pulleys are provided on the driving roller.

The belt device according to the second aspect of the present invention is the device of the first aspect, wherein the driven roller has a larger diameter in the central portion thereof than at the two end portions thereof in the axial direction.

In this device the driven roller is formed in a so-called crown shape. It is the general nature of belts to be inclined in the direction where belt tension is stronger, that is, the direction with the greater roller contact pressure. Thus, when belt meandering occurs while the belt is moving, and the belt becomes inclined toward either the left or right side, if the driven roller is formed in a crown shape, the belt will naturally return to the center because of the large contact pressure at the roller center, thereby preventing meandering.

In the present invention, pulleys are provided on both ends of the driven roller for the belt, and are caused to engage with ribs provided on the edges of both sides of the belt, enabling belt meandering prevention with a simple configuration.

DETAILED DESCRIPTION OF THE PREFERRED EMBODIMENTS

Figure 1:
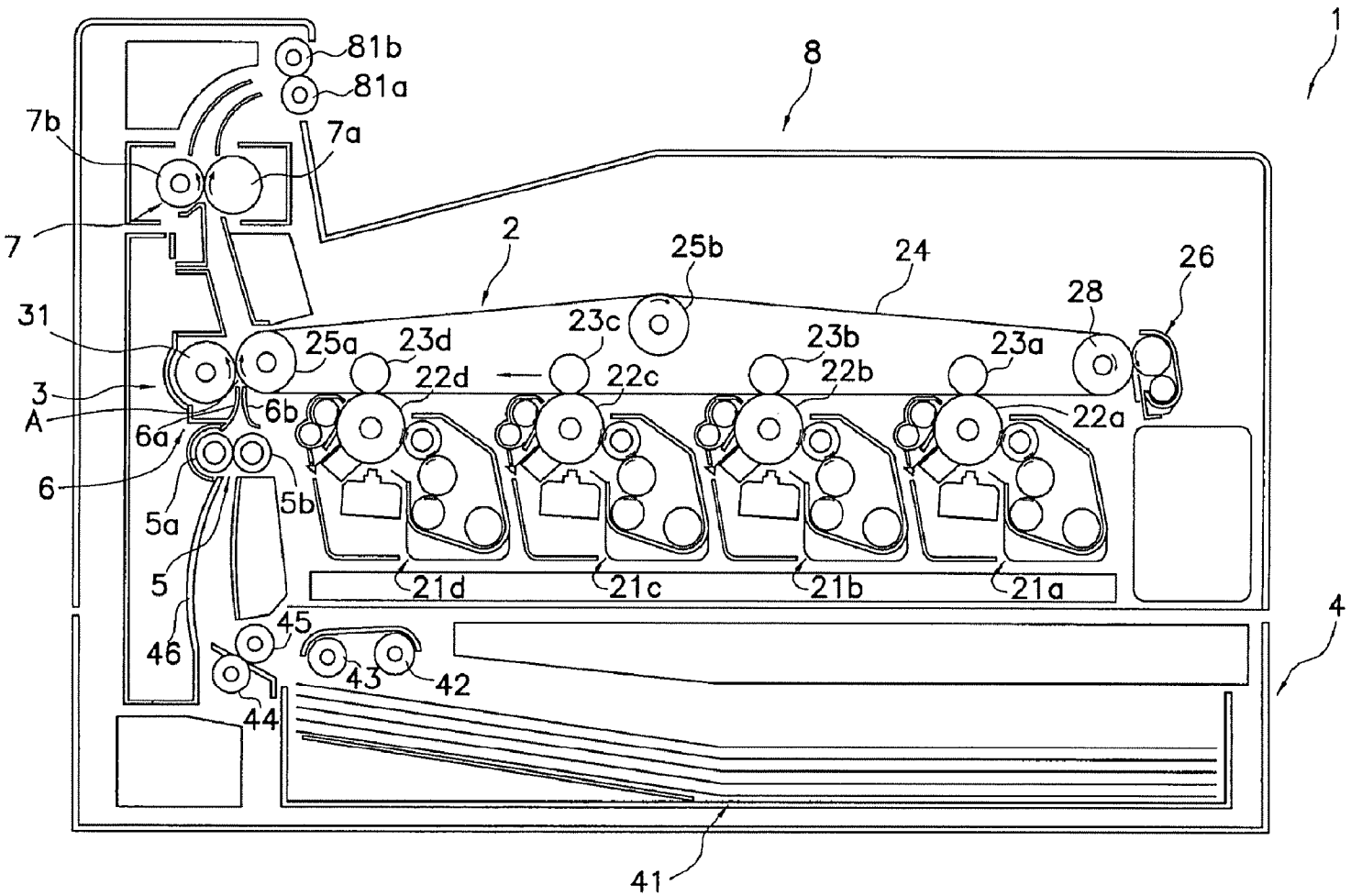
FIG. 1 is a diagram showing the primary parts of a color printer.

FIG. 1 is a diagram showing the constitution of the primary portions of a tandem color printer 1 using an embodiment of the present invention. The color printer 1 has an image forming unit 2 that forms a color image, a transfer unit 3 that transfers a toner image formed by the image forming unit 2 to a transfer material, a sheet feed unit 4 that supplies the transfer material, a resist roller unit 5 that synchronizes the transfer material transport and image formation, a transfer material transport guide mechanism 6 that guides transfer material that has reached the resist roller unit 5 to a transfer position, a fuser unit 7 that fuses the toner image transferred to the transfer material, and an output unit 8 that outputs the transfer material.

The image forming unit 2 is positioned roughly at the center of the color printer, and comprises, corresponding to the four colors of black, yellow, cyan and magenta, four process units 21a, 21b, 21c, 21d, four photosensitive drums 22a, 22b, 22c, 22d on the surface of which an electrostatic latent image is formed, four first transfer rollers 23a, 23b, 23c, 23d disposed opposite the photosensitive drums 22a, 22b, 22c, 22d that transfer a toner image formed on the photosensitive drum surfaces and a transfer belt 24 that serves as an image support.

Figure 2:
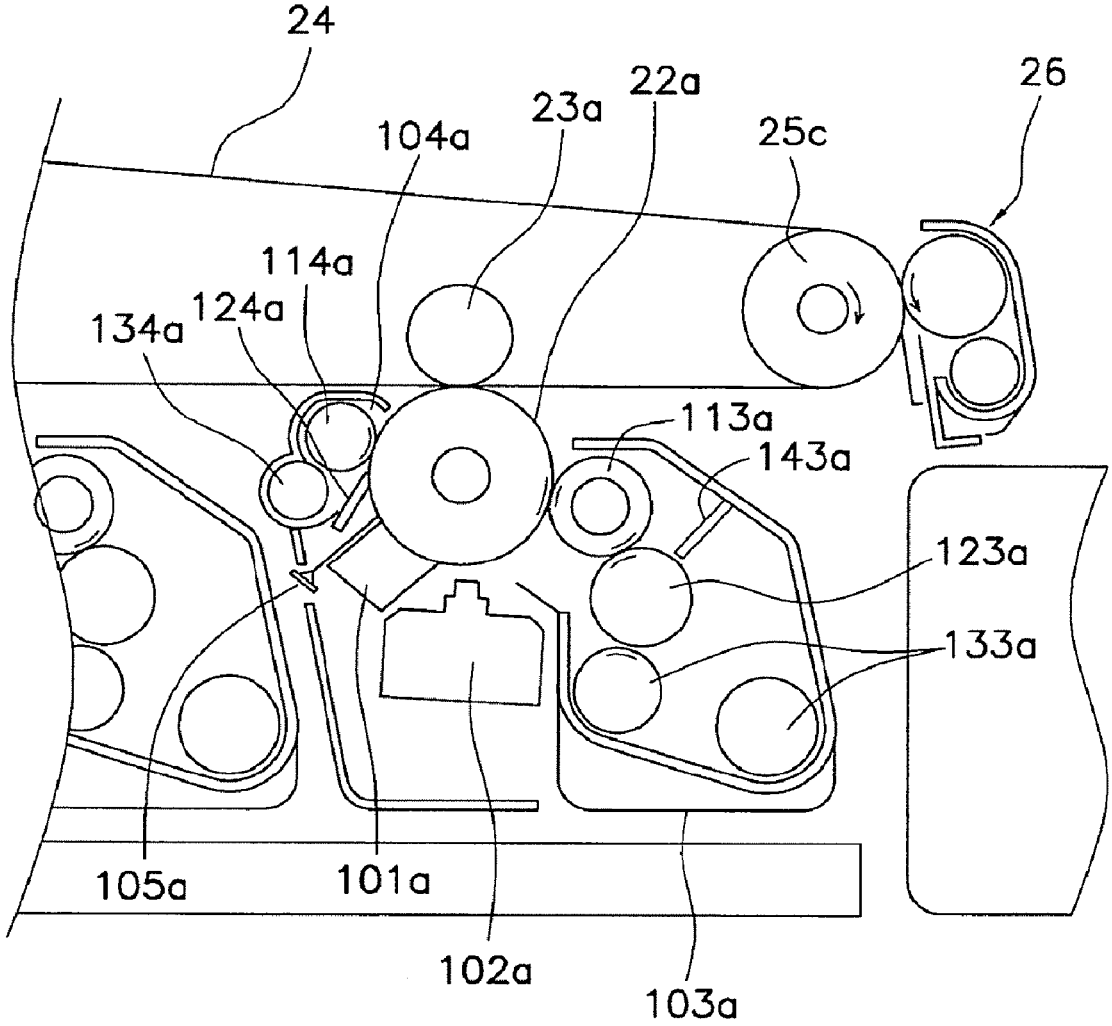
FIG. 2 is an enlarged view showing a black process unit.
Figure 3:
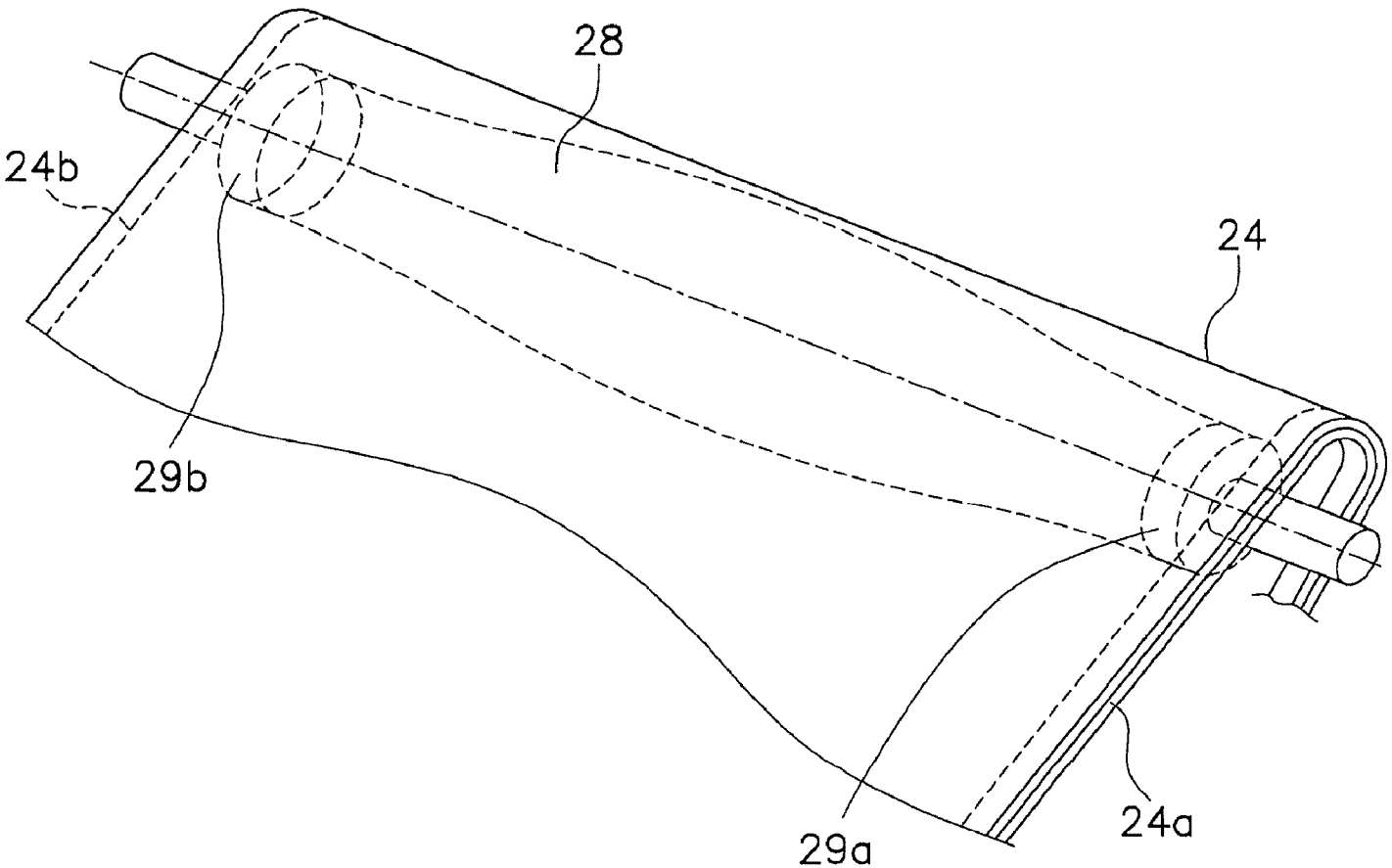
FIG. 3 is an oblique view showing a belt in a driven roller unit.

Because the four process units for black, yellow, cyan and magenta have identical interior constitutions, the constitution of the black process unit 21a will be explained as an example. As shown in FIG. 2, on the periphery of the photosensitive drum 22a of the black process unit 21a, there are disposed a charging device 101a, exposure device 102a, development device 103a, cleaning device 104a and decharging device 105a.

The sheet feed unit 4 is provided below the image forming unit 2, and comprises a cassette 41 for storing a transfer material, pickup rollers 42, 43 for removing stored sheets, and feed roller units 44, 45 for delivering sheets one by one to a transport path. A transfer material transported from the sheet feed unit 4 is transported to a transfer position via a vertical transport path 46. On the transport direction downstream of the vertical transport path 46, resist rollers 5a, 5b are provided which cause the transfer material transported from the sheet feed unit 4 to stand by, and in synchrony with image formation on the transfer belt 24, deliver the same to a transfer position A.

The fuser unit 7 for fusing the toner transferred on the transfer material is provided above the transfer unit 3. The fuser unit 7 has a heat roller 7a containing a heater and a pressure roller 7b for press contacting the heat roller 7a, transfer material is sandwiched between the rollers and transported, and the toner image transferred onto the transfer material surface is thereby fused. Above the fuser unit 7, output rollers 81a, 81b are provided, and the transfer material on which a toner image has been funned is output to an output unit 8 provided on the top of the color printer via the output rollers 81a, 81b.

The transfer belt 24, as shown in FIG. 1, is disposed above the photosensitive drums 22a, 22b, 22c, 22d, and stretched between the driving roller 25a rotary driven by drive means such as a motor (not shown in the drawing) and the driven roller 28 disposed separated front the driving roller 25a and driven in a rotating manner. Further, a tension roller 25b is provided between the driving roller 25a and driven roller 28. The tension roller 25b maintains the tension of the transfer belt using a tension adjustment mechanism (not shown in the drawing). The first transfer rollers 23a, 23b, 23c, 23d are urged so as to press against the photosensitive drums 22a, 22b, 22c, 22d via the transfer belt 24. As a result, the transfer belt 24 is pressed against the photosensitive drums 22a, 22b, 22c, 22d. Further, there is provided at a position facing the driven roller 28 an intermediate transfer cleaning device 26 for cleaning toner adhered to the transfer belt 24.

Figure 4:
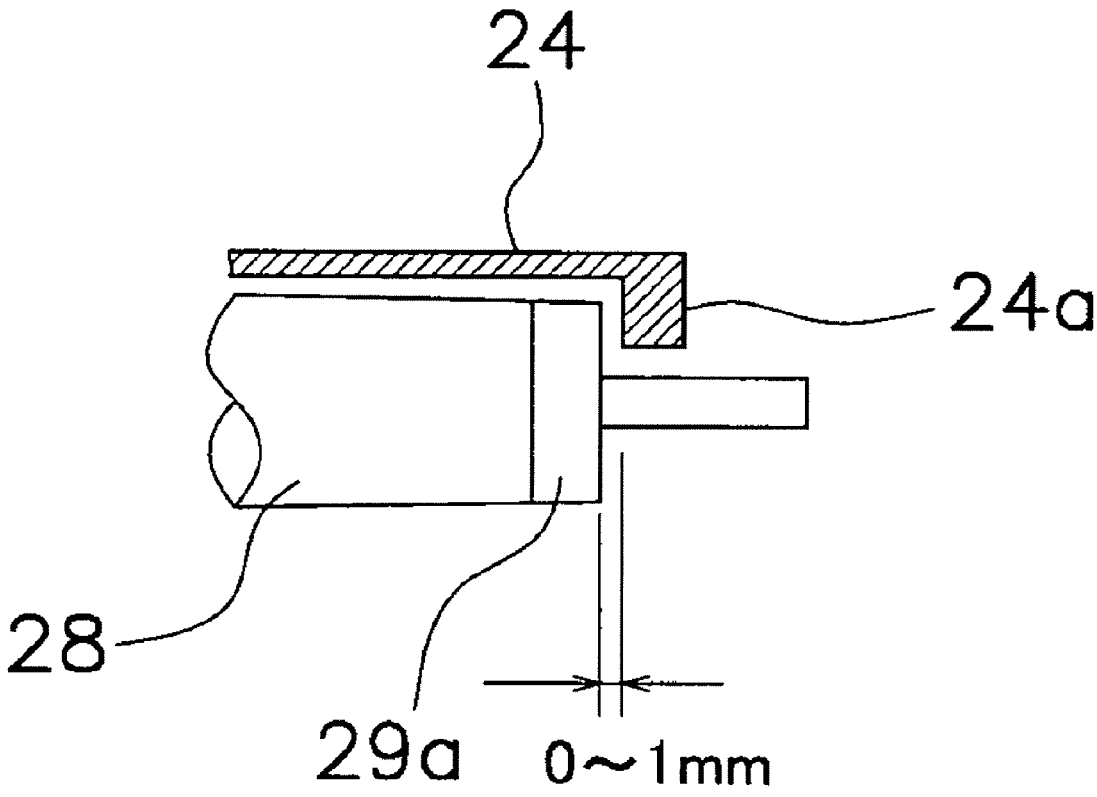
FIG. 4 is an enlarged view showing an outer side of a driven roller in the axial direction.

Here, as shown in FIGS. 2 and 4, a rib 24a is provided on the right edge in the width direction of the transfer belt 24. An identical rib 24b is also provided on the left side edge of the transfer belt 24. Further, the driven roller 28 is formed in a so-called crown shape such that the diameter at the roller center is larger than the diameter at both roller ends by roughly 0.2 mm. On both ends of the driven roller 28, pulleys 29a and 29b formed separately from the driven roller are provided. The rib 24a on the right side edge of the transfer belt 24 can engage with the outer side in the axial direction of the pulley 29a provided on the right side of the driven roller 28, and the rib 24b on the left side edge of the transfer belt 24 can engage with the outer side in the axial direction of the pulley 29b provided on the left side of the driven roller 28.

Next, the image forming operation will be explained. When a color printer is turned on, various parameters are initialized, such as the initial temperature setting for the fuser unit. Image data is received from a personal computer (not shown in the drawings) connected to the network or the like by an image data input unit. The image data thus received is delivered to the image forming unit 2.

A toner image is formed based on received image data at the process units 21a, 21b, 21c, 21d of the image forming unit 2. Here, an image forming operation will be explained using the black process unit 21a as an example. First, a photosensitive drum 22a is charged by the charging device 101a, exposure corresponding to the black image data is performed by the exposure device 102a, and an electrostatic latent image corresponding to the black image data is formed on the photosensitive drum 22a surface. The electrostatic latent image becomes a toner image in the black development device 103a, which is transferred to the transfer belt 24 by the transfer bias applied to the first transfer roller 23a. The residual developer remaining on the photosensitive drum 22a is cleaned by the cleaning device 104a, and discarded in a waste toner container (not shown in the drawing). Further, the photosensitive drum 22a is decharged by the decharging device 105a. Such operation is performed for the other colors, that is, magenta process unit 21b, cyan process unit 21c and yellow process unit 21d, thereby forming a full-color toner image on the transfer belt 24.

At the same time, in the sheet feed unit 4, a transfer material is taken from the sheet feeding cassette 41 by the pickup rollers 42, 43, and delivered to the vertical transport path 46 via the feed roller units 44, 45. Thereafter, the transfer material transported from the resist roller bodies 5a, 5b at a timing matching image formation on the transfer belt 24, is guided to the transfer unit 3 by the transfer material transport guide mechanism 6. The transfer unit 3 is configured such that a secondary transfer roller 31 is in direct contact with the transfer belt 24, and by a secondary transfer bias applied to the secondary transfer roller 31, a full-color toner image formed on the transfer belt 24 is transferred to the transfer material. The full-color toner image transferred to the transfer material is heated and pressurized by fusing means 7 and thus fused to the transfer material, and the transfer material on which a full-color toner image is formed is output to the output unit 8. The toner remaining on the transfer belt 24 is cleaned by the intermediate transfer cleaning device 26 and discarded in a waste toner container (not shown in the drawing).

In such an image forming process, when the driving roller 25a is rotary driven by the drive device (not shown in the drawing), the transfer belt 24 starts to move. Driven by the movement of the transfer belt 24, the tension roller 25b and the driven roller 28 on which the transfer belt 24 is stretched are rotated as well. At this time, if for example the transfer belt 24 becomes inclined to the left side between the driving roller 25a and driven roller 28 due to a difference in the peripheral lengths of each side thereof, the rib 24a on the right side edge of the transfer belt 24 will be restricted by the edge of the pulley 29a provided on the right side end of the driven roller 28, and at the position of the driven roller 28, meandering will be corrected to the left. Further, because the pulley 29a is constituted as a separate component from the driven roller 28, and there is a gap of 0-1 mm between the outer side in the axial direction of the pulley 29a and the right side edge rib 24a of the transfer belt 24, the meandering of the transfer belt 24 is corrected as the pulley 29a moves laterally, and wear on right side rib 24a of the transfer belt 24 is reduced.

Further, in the present invention, the driven roller 28 is formed in a crown shape such that the diameter is larger at the roller center than at the ends thereof by roughly 0.2 mm. It is the nature of the belt to be inclined in the direction where belt tension is stronger, that is, the direction with the greater roller contact pressure. When belt meandering occurs while the transfer belt 24 is moving and the transfer belt 24 becomes inclined toward the left, because the driven roller 28 is formed in a crown shape, contact pressure on the left side of the roller is smaller and contact pressure on the roller center is larger. Therefore, the transfer belt 24 naturally returns to the center, thereby preventing meandering.

In the present embodiment, pulleys 29a, 29b formed separately from the driven roller 28 are provided on the both ends of the driven roller 28, and ribs 24a, 24b that can engage with the outer sides of the pulleys 29a, 29b in the axial direction are provided on both sides edges of the transfer belt 24 in the width direction. When the transfer belt 24 becomes inclined to the left side while moving, the rib 24a on the right edge of the transfer belt 24 is restricted by the outer side in the axial direction of the pulley 29a provided on the right edge of the driven roller 28, thereby correcting meandering to the left side at the position of the driven roller 28. When meandering to the right side occurs as well, meandering is corrected in the same manner. Therefore, even when the transfer belt 24 is long, due to the restriction at the driven roller 28, belt meandering is corrected with a simple configuration.

Other Embodiments

The present embodiment exemplifies a case where a tandem-type color printer is used as an image forming device and a transfer belt as a belt. It goes without saying that the present invention can also be used in a case where a monochrome printer is the image forming device and a photosensitive belt, original document transport belt, or the like is the belt. Further, the present invention can be used in a photocopier, printer, facsimile and other image forming devices.

What is claimed is:

1. A belt device comprising:

a driving roller driven by a drive unit;

a driven roller disposed so as to face the driving roller;

pulleys disposed on both ends of the driven roller so as to [freely] rotate *freely,* coaxially, and relatively with respect to the driven roller, each pulley having [a substantially flat] *an* outer circumferential surface *having a substantially constant radius, each pulley formed separately from the driven roller*; and a belt stretched [between] *around* the driving roller and driven roller, the belt comprising a plurality of ribs arranged on the edges thereof[;],

[wherein] the inner lateral surfaces of the ribs [are] *being* disposed between 0 and 1 mm from [the] outermost ends of the pulleys in the axial direction*, meandering of the belt being corrected when one of the ribs moves laterally and contacts one of the pulleys in an axial direction*.

2. A belt device according to claim 1, wherein at least the center diameter of the driven roller is larger than the diameter of both ends of the driven roller in the roller axial direction.

*3. A belt device comprising:*

*a driving roller driven by a drive unit;*

*a driven roller disposed so as to face the driving roller;*

*pulleys disposed on both ends of the driven roller so as to rotate freely, coaxially, and relatively with respect to the driven roller, each pulley formed separately from the driven roller and being devoid of grooves; and*

*a belt stretched around the driving roller and driven roller, the belt having ribs being formed on the edges of both sides of the belt, the ribs being configured to engage with the outside of the pulleys in the axial direction to correct belt meandering, meandering of the belt being corrected when one of the ribs moves laterally and contacts one of the pulleys in an axial direction, the inner lateral surfaces of the ribs being disposed between 0 and 1 mm from outermost ends of the pulleys in the axial direction.*

*4. A belt device according to claim 2, wherein*

*the ribs are configured to engage with the outermost ends to correct belt meandering.*

*5. A belt device according to claim 1, wherein*

*the ribs are configured to engage with the outermost ends to correct belt meandering.*

* * * * *